(12) United States Patent
Chang et al.

(10) Patent No.: US 8,955,760 B2
(45) Date of Patent: Feb. 17, 2015

(54) CODE PATTERN FOR PROVIDING INFORMATION AND DECODING METHOD AND IMAGE PROCESSING DEVICE

(75) Inventors: Cheng-Ru Chang, Hsin-Chu (TW); Wei-Kuo Mai, Hsin-Chu (TW)

(73) Assignee: Elan Microelectronics Corp., Hsin-Chu (TW)

( * ) Notice: Subject to any disclaimer, the term of this patent is extended or adjusted under 35 U.S.C. 154(b) by 1312 days.

(21) Appl. No.: 12/412,679

(22) Filed: Mar. 27, 2009

(65) Prior Publication Data

US 2010/0128997 A1 May 27, 2010

(30) Foreign Application Priority Data

Nov. 26, 2008 (TW) ................................ 97145752 A

(51) Int. Cl.
*G06K 19/06* (2006.01)
*G06K 7/14* (2006.01)

(52) U.S. Cl.
CPC ........ *G06K 19/06037* (2013.01); *G06K 7/1417* (2013.01)
USPC .......................................... 235/494; 235/454

(58) Field of Classification Search
CPC .......... G06K 19/06037; G06K 7/1417; G06K 7/1443; G06K 7/1456
USPC .............................................. 235/462.15, 494
See application file for complete search history.

(56) References Cited

U.S. PATENT DOCUMENTS 5,866,895 A * 2/1999 Fukuda et al. ................. 235/494
2005/0173544 A1* 8/2005 Yoshida ......................... 235/494

* cited by examiner

*Primary Examiner* — Christopher Stanford
(74) *Attorney, Agent, or Firm* — Muncy, Geissler, Olds & Lowe, P.C.

(57) ABSTRACT

A code pattern for providing information is disclosed, which can effectively improve the ratio of effective marks, and the effective marks are distributed in a rhombus area. The code pattern comprises: a plurality of nominal positions and a plurality of information marks. The nominal positions are respectively located at a plurality of intersections of a plurality of first hypothetical lines and a plurality of second hypothetical lines, and the first hypothetical lines are parallel to one diagonal line within the rhombus area. The plurality of information marks are respectively disposed within the area formed by the nominal positions, and each information mark is used to represent one of at least two values.

6 Claims, 21 Drawing Sheets

00

| 1  | 2  | 3  | 4  | 5  |
|----|----|----|----|----|
| 6  | 7  | 8  | 9  | 10 |
| 11 | 12 | 13 | 14 | 15 |
| 16 | 17 | 18 | 19 | 20 |
| 21 | 22 | 23 | 24 | 25 |

| 1  | 2  | 3  | 4  | 5  |
|----|----|----|----|----|
| 6  | 7  | 8  | 9  | 10 |
| 11 | 12 | 13 | 14 | 15 |
| 16 | 17 | 18 | 19 | 20 |
| 21 | 22 | 23 | 24 | 25 |

| 1  | 2  | 3  | 4  | 5  |
|----|----|----|----|----|
| 6  | 7  | 8  | 9  | 10 |
| 11 | 12 | 13 | 14 | 15 |
| 16 | 17 | 18 | 19 | 20 |
| 21 | 22 | 23 | 24 | 25 |

| 1  | 2  | 3  | 4  | 5  |
|----|----|----|----|----|
| 6  | 7  | 8  | 9  | 10 |
| 11 | 12 | 13 | 14 | 15 |
| 16 | 17 | 18 | 19 | 20 |
| 21 | 22 | 23 | 24 | 25 |

|   | 00 |   |   |   |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |

FIG. 11A

|   | 01 |   |   |   |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |

FIG. 11B

|   | 10 |   |   |   |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |

FIG. 11C

|   | 11 |   |   |   |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |

| 1 | 2 | 3 | 4 | 5 |
|---|---|---|---|---|
| 6 | 7 | 8 | ⊘9 | 10 |
| 11 | 12 | 13 | 14 | 15 |
| 16 | 17 | 18 | 19 | 20 |
| 21 | 22 | 23 | 24 | 25 |

| 1 | 2 | 3 | 4 | 5 |
|---|---|---|---|---|
| 6 | 7 | 8 | 9 | 10 |
| 11 | 12 | 13 | ⊘14 | 15 |
| 16 | 17 | 18 | 19 | 20 |
| 21 | 22 | 23 | 24 | 25 |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | ⊘19 | 20 |
| 21 | 22 | 23 | 24 | 25 |

| 1 | 2 | 3 | 4 | 5 |
|---|---|---|---|---|
| 6 | 7 | 8 | 9 | 10 |
| 11 | 12 | 13 | 14 | 15 |
| 16 | 17 | ⊘18 | 19 | 20 |
| 21 | 22 | 23 | 24 | 25 |

| 1 | 2 | 3 | 4 | 5⃝—20a |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

| 1 | 2 | 3 | 4 | 5 |
|---|---|---|---|---|
| 6 | 7 | 8 | 9 | 10 |
| 11 | 12 | 13 | 14 | 15⃝—20a |
| 16 | 17 | 18 | 19 | 20 |
| 21 | 22 | 23 | 24 | 25 |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25⃝—20a |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23⃝ | 24 | 25 |

CODE PATTERN FOR PROVIDING INFORMATION AND DECODING METHOD AND IMAGE PROCESSING DEVICE

FIELD OF THE INVENTION

The present invention relates to a code pattern, and particularly to a code pattern with rhombus area distribution.

BACKGROUND OF THE INVENTION

Prior art about code pattern and code patterns were disclosed in Japanese Invention Patent Application Publication No. 2007-11890, U.S. Patent Application Publication No. US2007/0246547, Taiwanese Patent Application Publication No. 094205159, U.S. Patent Application Publication No. US2003/011164, and U.S. Patent Application Publication No. US2006/0007255.

FIG. 1 shows an example of the conventional code pattern and the conventional code patterns. All of the marks 10a for the conventional code pattern 10 are arranged in a square, and all of the conventional code patterns 10 are arranged together, which are also arranged as a conventional code patterns 1 in a square.

FIG. 2 shows an example of the conventional code pattern arranged in a square. In the conventional code pattern 10 shown as FIG. 2, there are 16 marks for boundary (marked with "●"), and 3 marks for orientation (marked with "▲"), and 13 marks for information (marked with "■"), so that the ratio of effective marks is 40%, i.e. 13/(16+3+13)=40%.

FIG. 3 shows another example of the conventional code pattern arranged in a square. In the code pattern shown as FIG. 3, there are 7 marks for boundary (marked with "●"), and 9 marks for information (marked with "■"), so that the ratio of effective mark is 56%, i.e. 9/(7+9)=56%.

In view of the necessity of further improvement on the ratio of effective mark achieved by the conventional coding method of the conventional code pattern, the inventors of the present invention worked hard and proposed a code pattern with a rhombus area distribution, which can effectively improve the ratio of effective marks.

SUMMARY OF THE INVENTION

The object of the present invention is to provide a code pattern, which can effectively improve the ratio of effective marks.

The another object of the present invention is to provide a decoding method for each code pattern, which can decode the information represented by each information mark of the code pattern in a rhombus area distribution.

The further another object of the present invention is to provide an image processing device for processing the code pattern, which can process the code pattern in a rhombus area distribution, and output the information represented by each information mark of the code pattern.

In order to accomplish the object of the present invention, the present invention provides a code pattern for providing information according to claim 1 and claim 7.

In order to accomplish the another object of the present invention, the present invention provides a decoding method or a reading method for each code pattern according to claim 13.

In order to accomplish the further another object of the present invention, the present invention provides an image processing device for processing code pattern according claim 18.

BRIEF DESCRIPTION OF DRAWINGS

The following illustrative embodiments and accompanying drawings are provided to illustrate these and other advantages, effects, and structural features of the present invention.

FIG. 10A~10D show coding examples of the low shift information marks of the code pattern according to the present invention;

FIG. 11A~11D show coding examples of the high shift information marks of the code pattern according to the present invention;

Figures 12E, 12F, 12G, 12H:
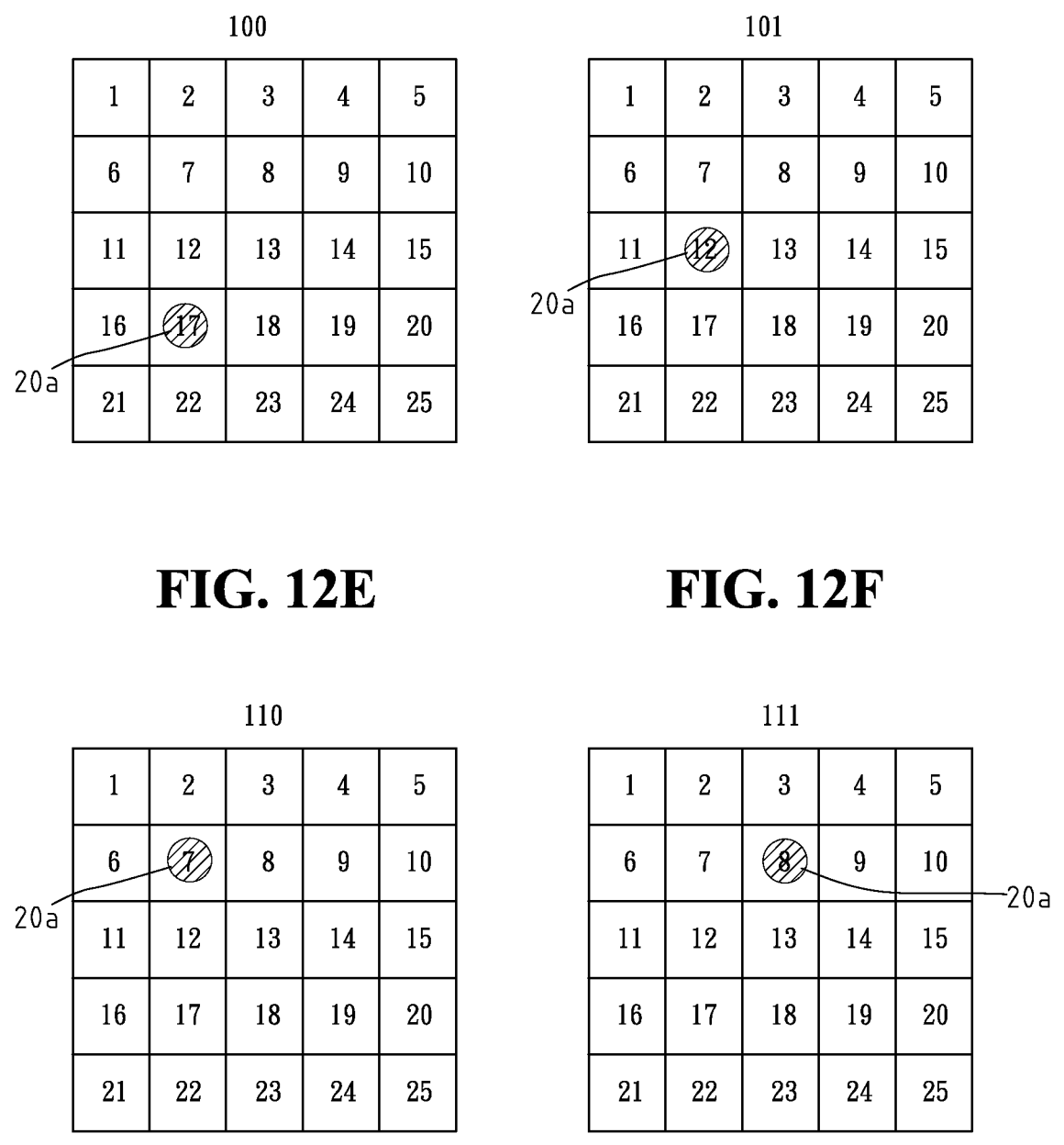

FIG. 12A~12H show other coding examples of the low shift information marks of the code pattern according to the present invention;

Figures 13E, 13F, 13G, 13H:
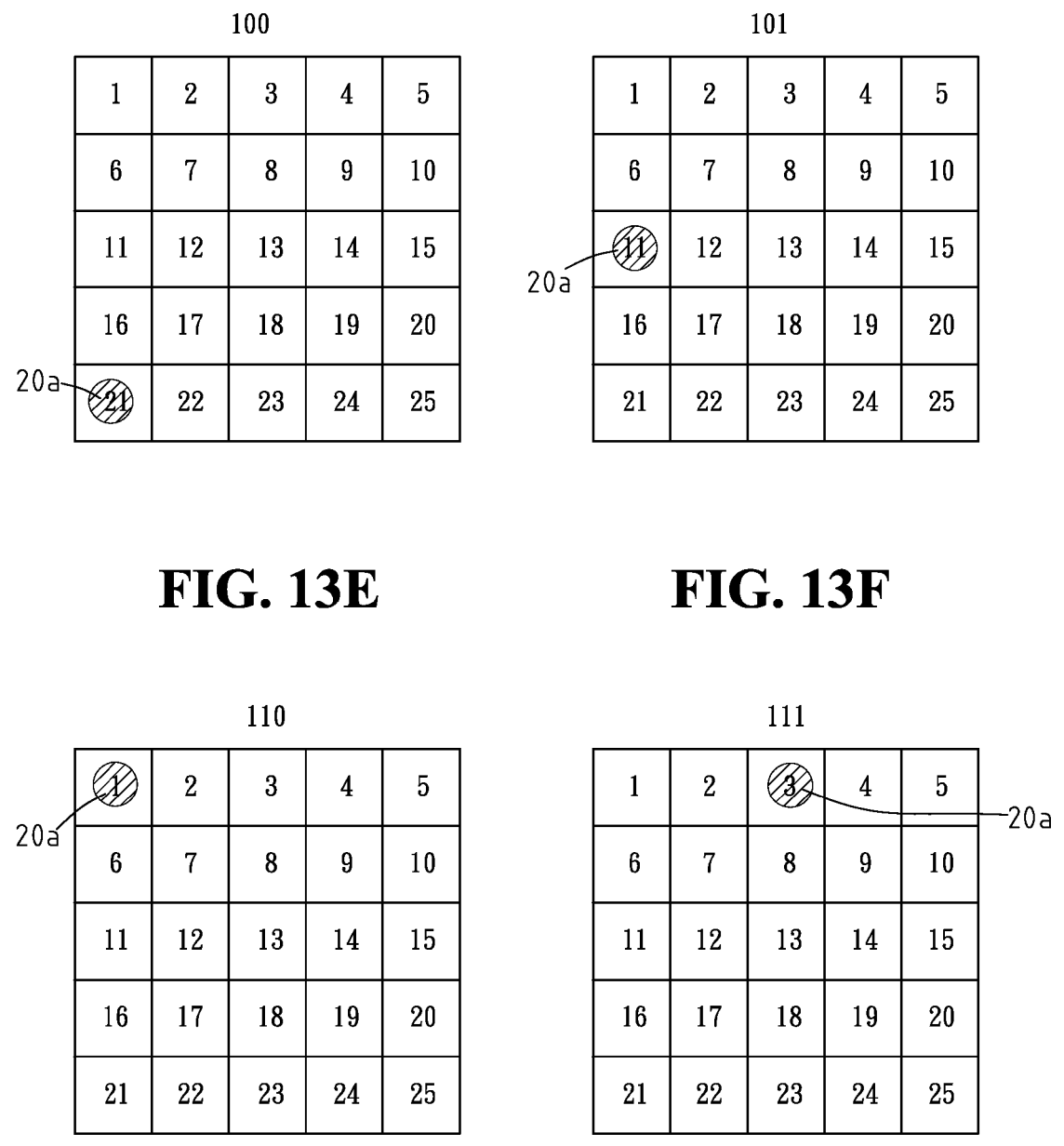

FIG. 13A~13H show other coding examples of the high shift information marks of the code pattern according to the present invention;

Figures 14A, 14B, 14C, 14D:
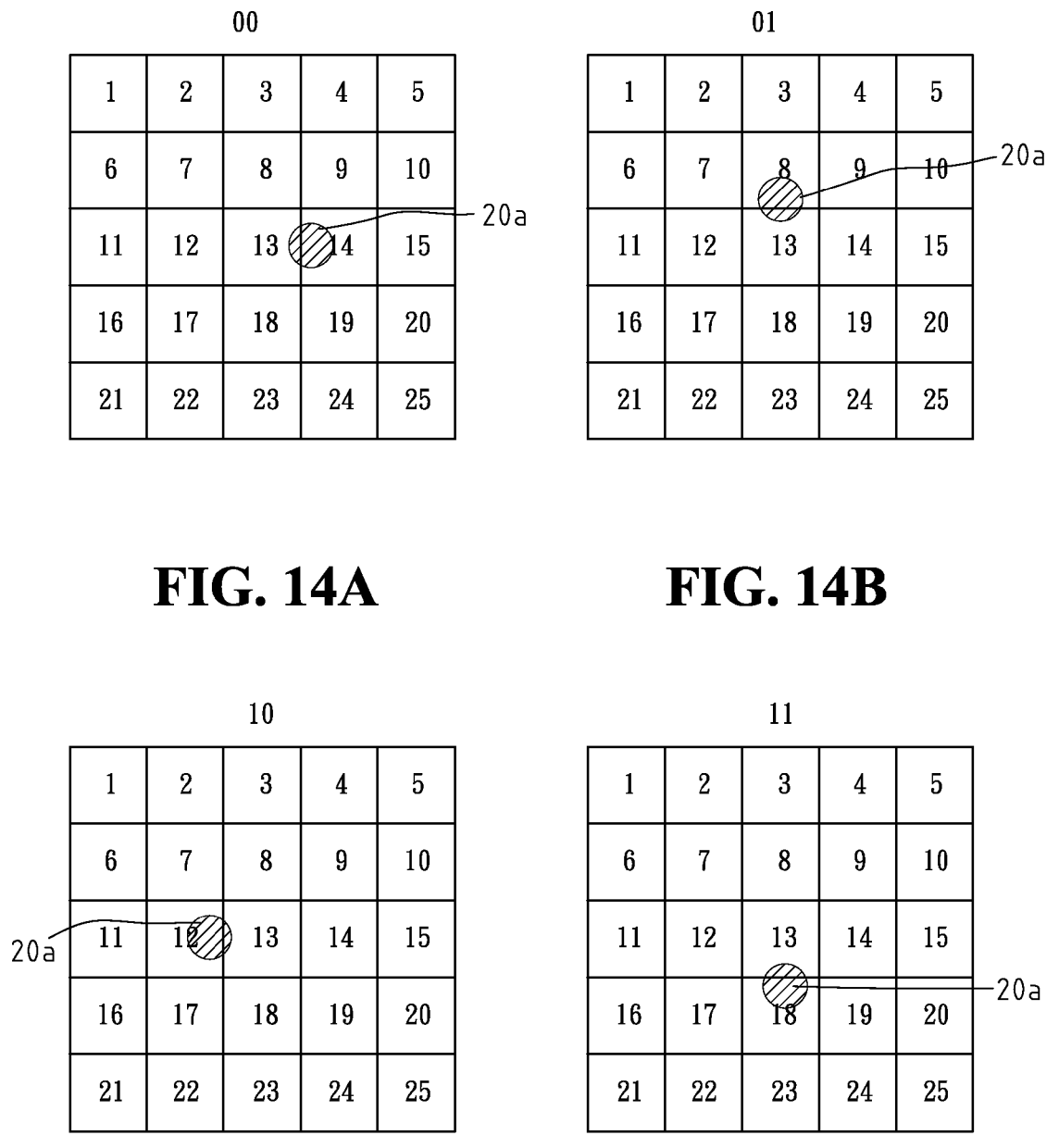

FIG. 14A~14D show further other coding examples of the low shift information marks of the code pattern according to the present invention;

Figures 15A, 15B, 15C, 15D:
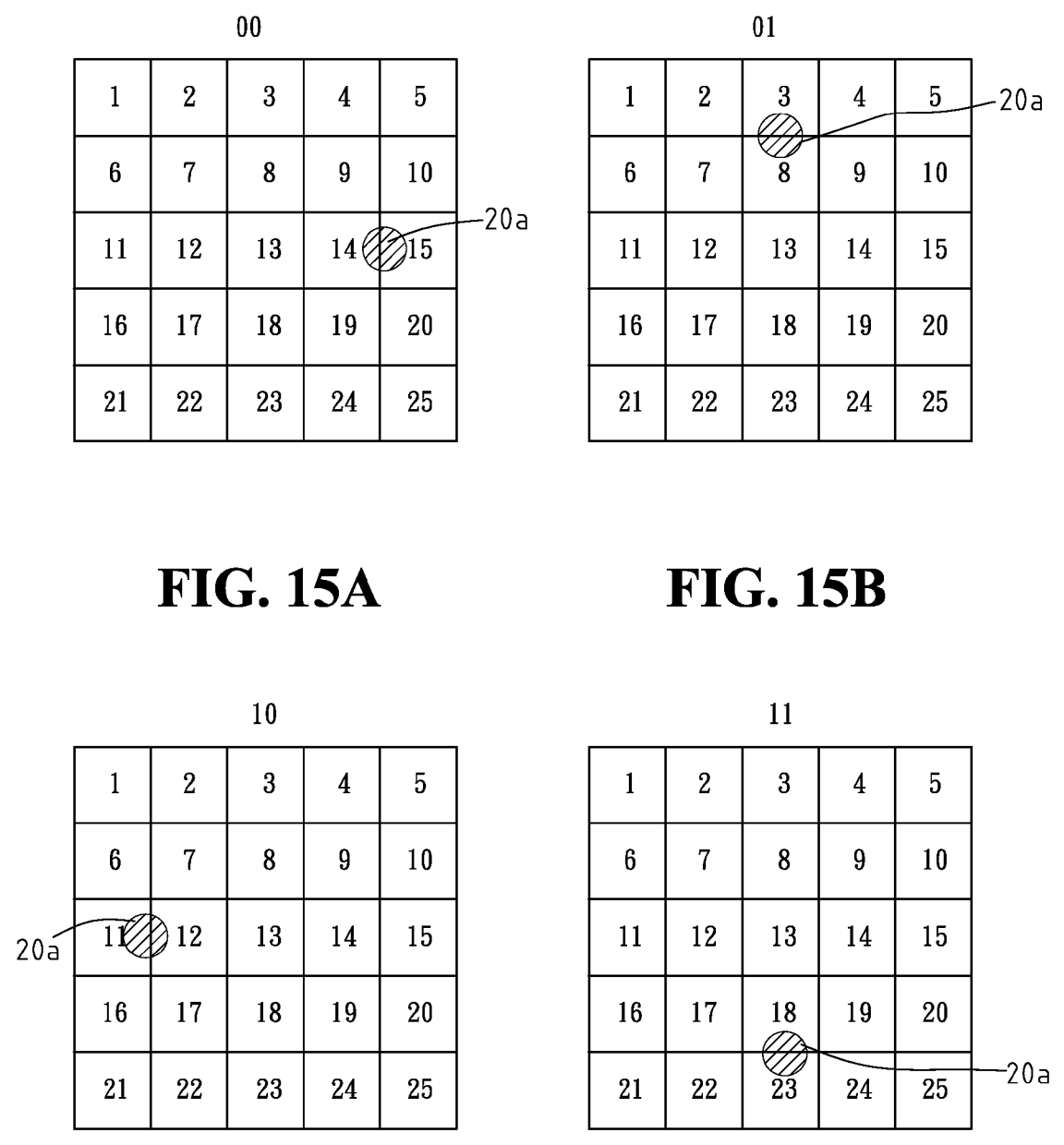

FIG. 15A~15D show further other coding examples of the high shift information marks of the code pattern according to the present invention;

DETAILED DESCRIPTION OF THE INVENTION

Please refer to FIG. 4A to FIG. 17B. The code pattern 20 according to the present invention is provided with a plurality of marks 20a, and the arrangement method for the marks 20a is to be arranged in a rhombus area 4. In the rhombus area 4, a plurality of nominal positions n, n=0, 1, 2, . . . , 11, are located at a plurality of intersections of a plurality of first hypothetical lines 41 and a plurality of second hypothetical lines 43.

In the code pattern 20, a plurality of first hypothetical lines 41 can be employed as being parallel to one diagonal line in the rhombus area 4, and a plurality of second hypothetical lines 43 can be employed as being parallel to another diagonal line in the rhombus area 4. The first hypothetical lines 41 and the second hypothetical lines 43 will divide the interior area of the rhombus area 4 into a plurality of nominal grids.

Figure 4A:
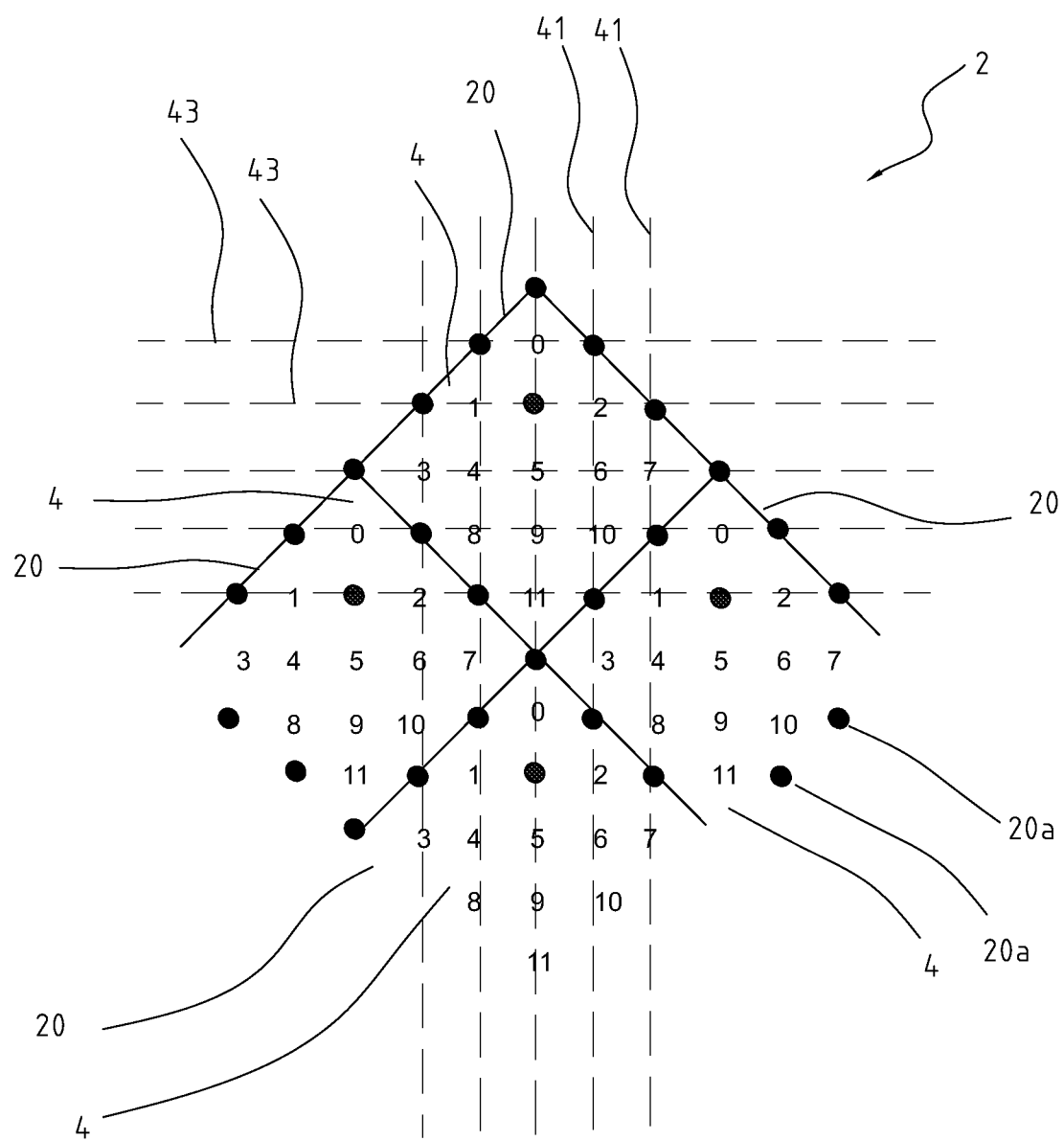
FIG. 4A shows a diagram of the code patterns for providing information according to the present invention.
Figure 4B:
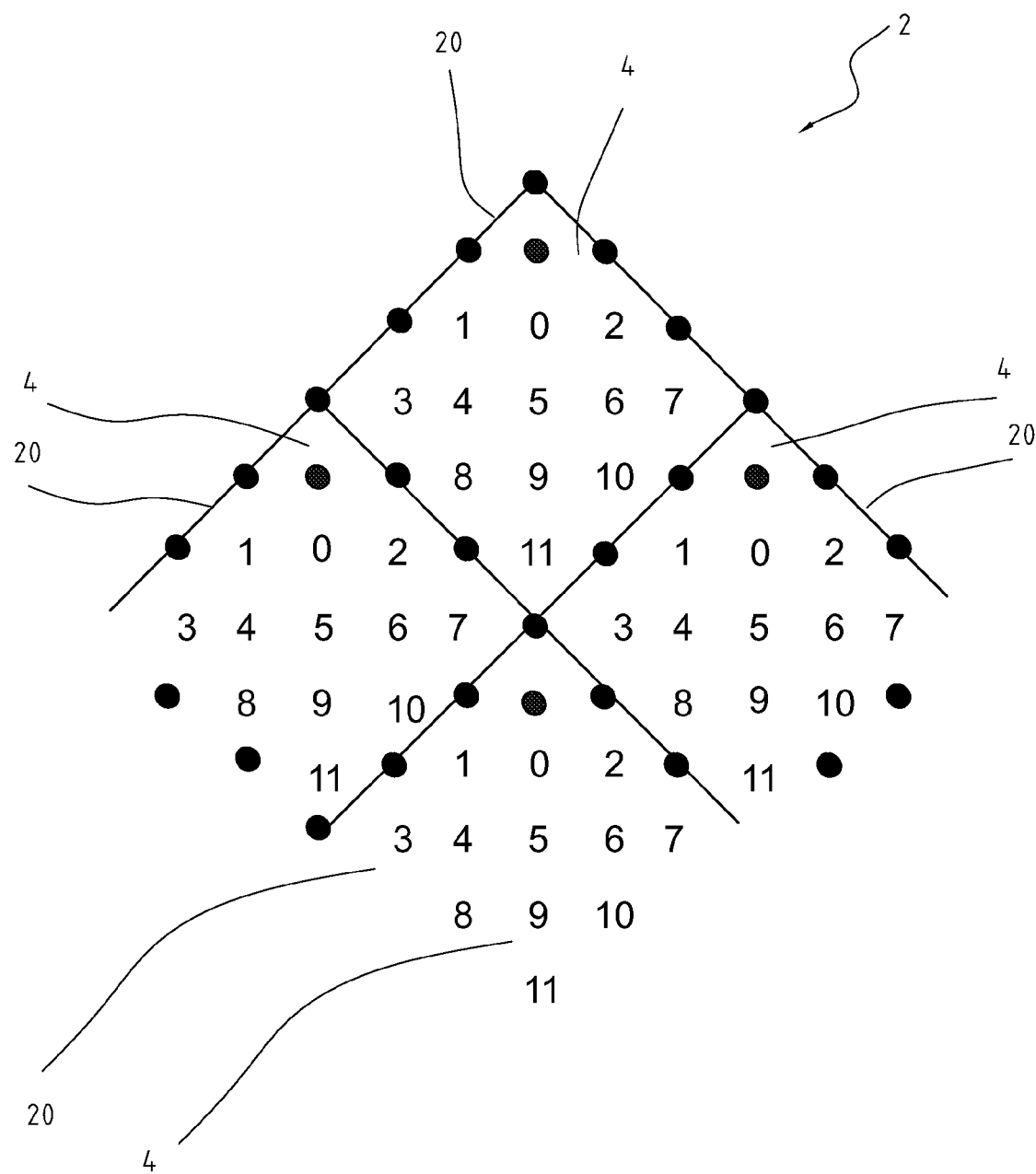
FIG. 4B shows a variance diagram of the code patterns for providing information according to the present invention.
Figure 5:
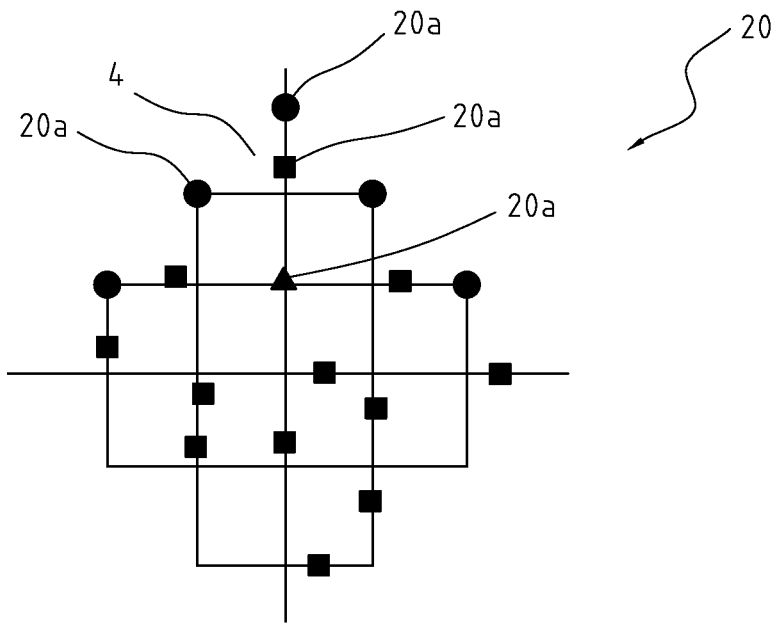
FIG. 5 shows an embodiment of the code pattern for providing information according to the present invention.

In FIG. 5, within the rhombus area 4, the present invention selects the marks 20*a* disposed on two neighbored sides on the upper half of the code pattern 20 as the boundary marks (marked with "●") for boundary. At the same time, one mark 20*a* of the code pattern 20 which is located at one nominal position is selected to be the orientation mark for orientation (marked with "▲"). The other marks 20*a* are used as the information marks to provide information (marked with "■"). For the convenience of description, the numerical reference appeared in FIG. 4A to FIG. 17A are used to indicate the locations of information marks in the code pattern 20. The marks 20*a* employs different shapes of marking, such as "●", "▲", and "■", only for the purpose of easy understanding of the disclosure. Practically, the marks 20*a* for boundary function, orientation function and information function respectively can employ the same shape of marking.

The actual arrangement location for each information mark 20*a* will have a displacement with orientation and distance to the corresponding nominal position n.

Figure 1:
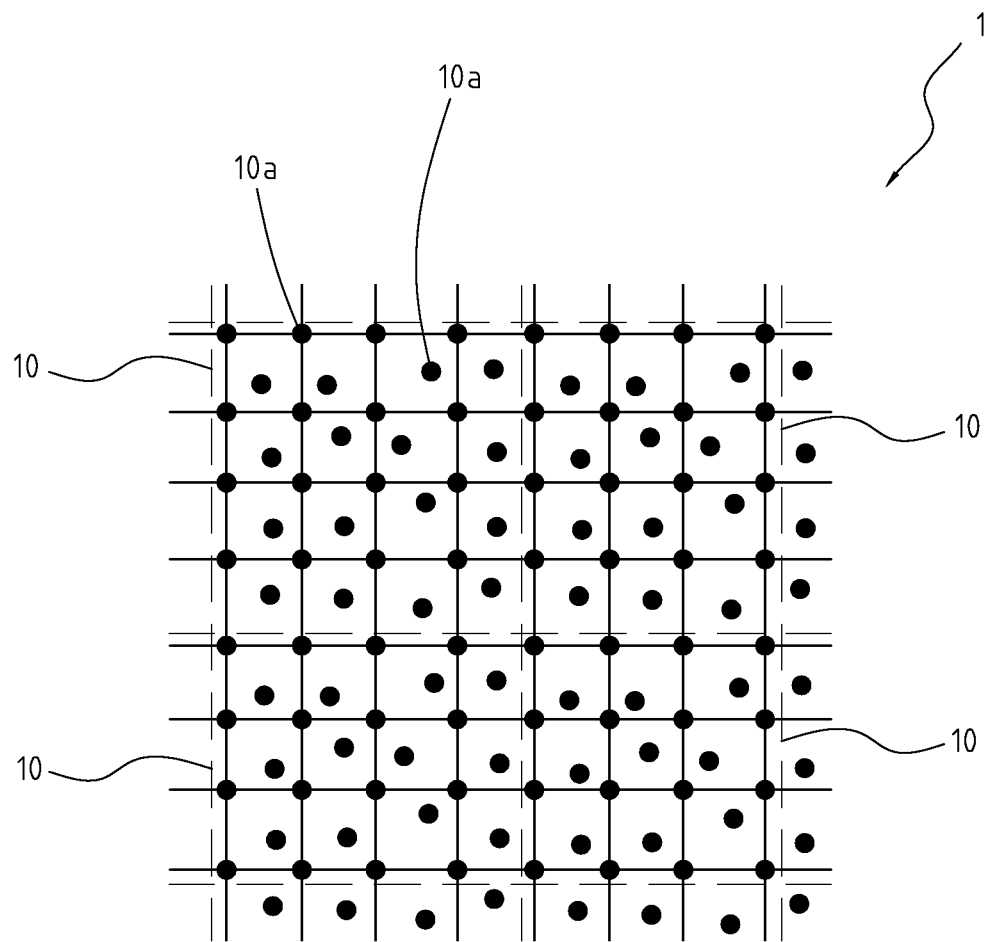
FIG. 1 shows an example of the conventional code pattern and the conventional code patterns.
Figure 2:
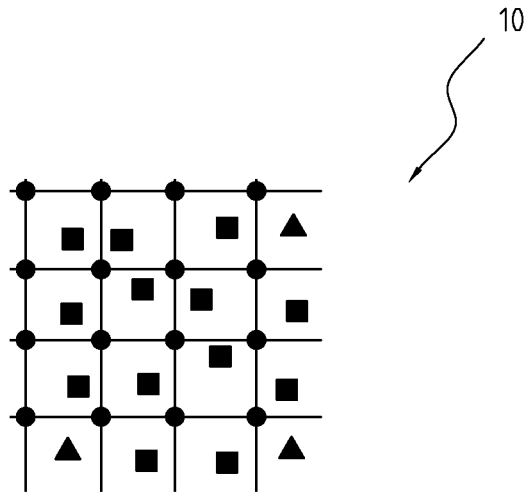
FIG. 2 shows an example of the conventional code pattern arranged in a square.
Figure 3:
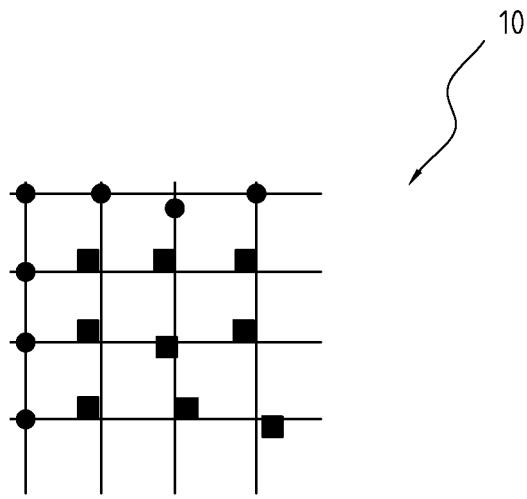
FIG. 3 shows another example of the conventional code pattern arranged in a square.

In FIG. 5, the code pattern 20 according to the present invention only needs five boundary marks and one orientation mark, and can accommodate 12 information marks. The ratio of effective mark is 66.7%, i.e. 12/(5+1+12)=66.7%. Comparing to the ratio of effective mark of the conventional code pattern in FIG. 2 and FIG. 3, the code pattern according to the present invention not only has the minimum required boundary marks, but also has the highest ratio of effective mark.

FIG. 4A shows an example of code patterns 2 according to the present invention, and FIG. 4B shows another example of code patterns 2 according to the present invention. The numerical reference appeared in the rhombus area 4 are used to indicate the nominal position n (n=0, 1, 2, . . . , 11). Each information mark 20*a* is located at a position having a displacement with orientation and distance to the corresponding nominal position n.

Figure 6:
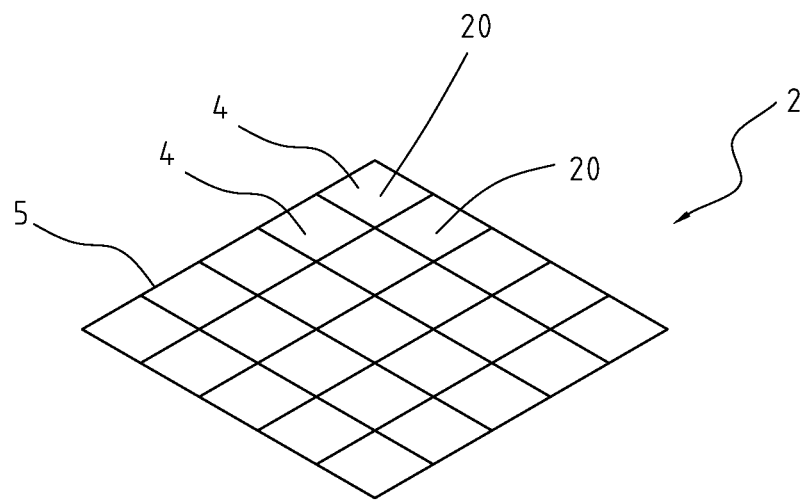
FIG. 6 shows a diagram of the code patterns according to the present invention.
Figure 7:
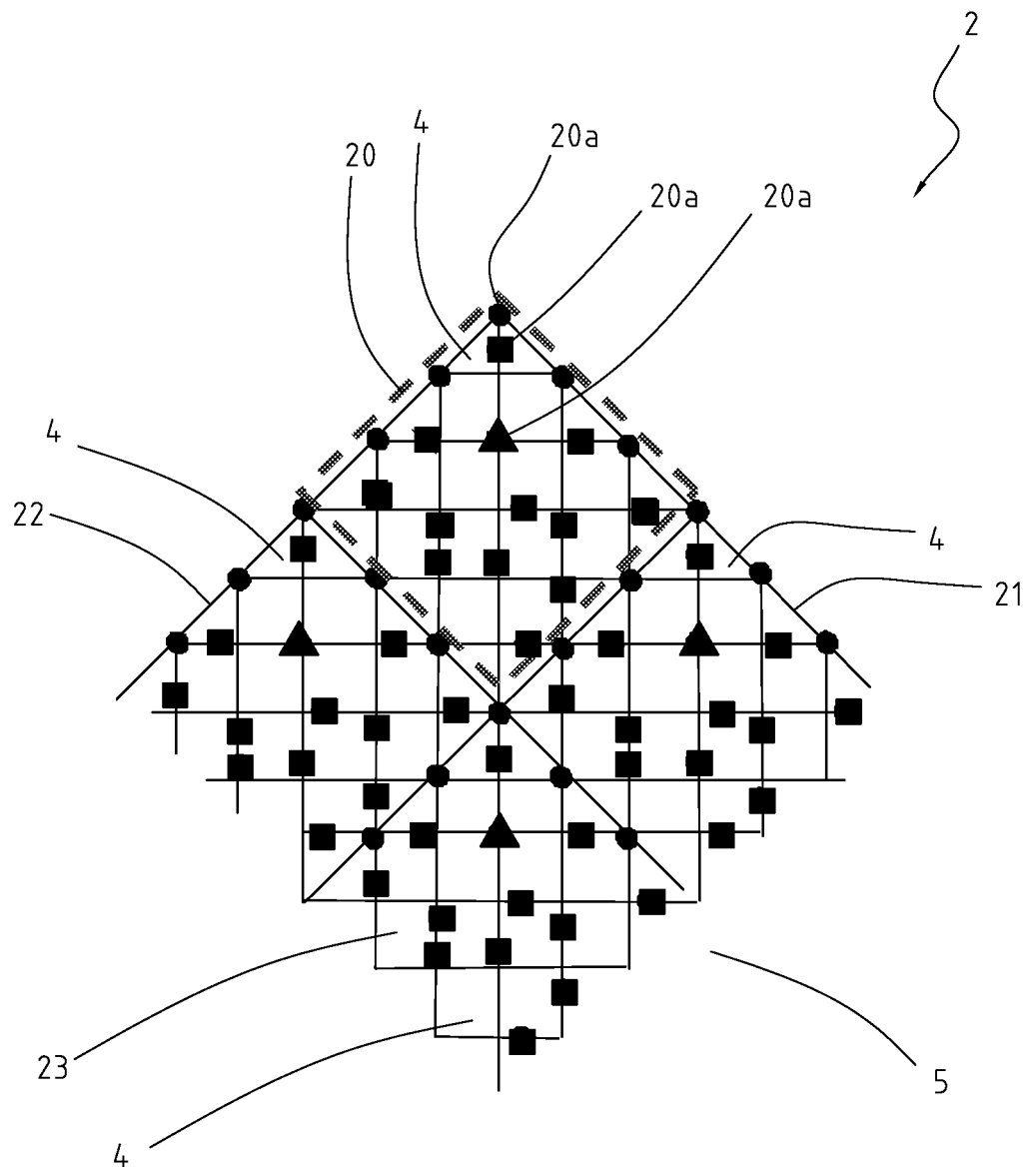
FIG. 7 shows an embodiment of the code patterns for providing information according to the present invention.

FIG. 6 shows a diagram of the code patterns according to the present invention. The individual code pattern 20 is located in individual rhombus area 4. Each of the rhombus areas 4 is neighbored to each other. FIG. 7 shows an embodiment of the code patterns for providing information according to the present invention. The four code patterns 20-23 are arranged as the code patterns 2 in the rhombus area, and neighbored two code patterns 20, 21, code patterns 20, 22, code patterns 22, 23, and code patterns 21, 23 are all neighbored to each other in the slanting direction (the slanting direction from upper right to lower left, or the slanting direction from upper left to lower right).

Figure 8:
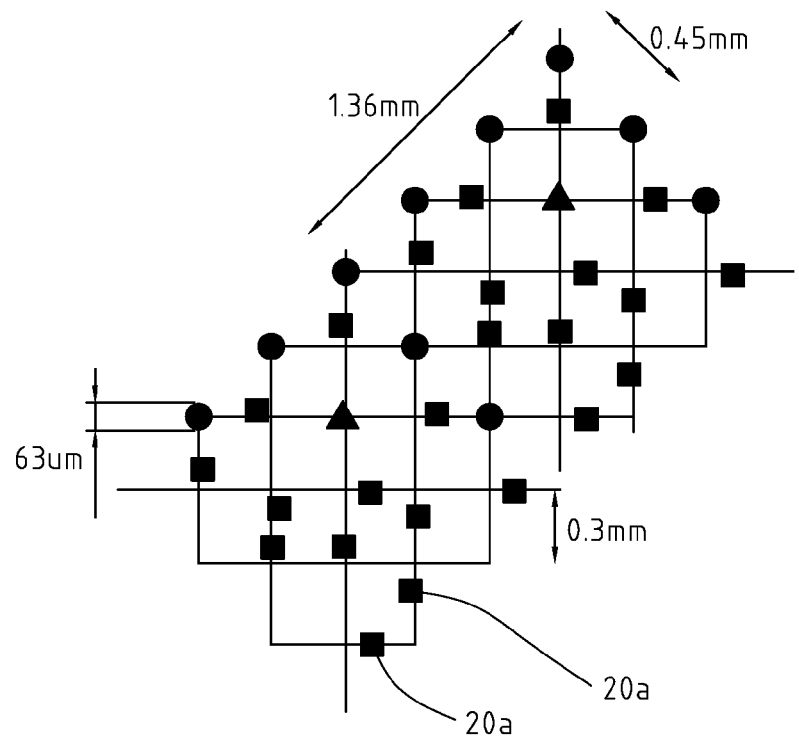
FIG. 8 shows an example of printing quality of the code patterns according to the present invention.

FIG. 8 shows an example of printing quality of the code patterns according to the present invention. Taking printing in 1,200 DPI for example, the diameter of each carbon dot by 1,200 DPI laser printer is about 21 um. The present invention employs 9 carbon dots to print out each mark 20*a* with 3*3 carbon dot pattern, i.e. composing a mark 20*a* with 3*3 carbon dot matrix, so that the diameter of the mark 20*a* is three carbon dots, i.e. 63 um. The interval for the nominal position n employs 0.3 mm as distance.

Figure 9:
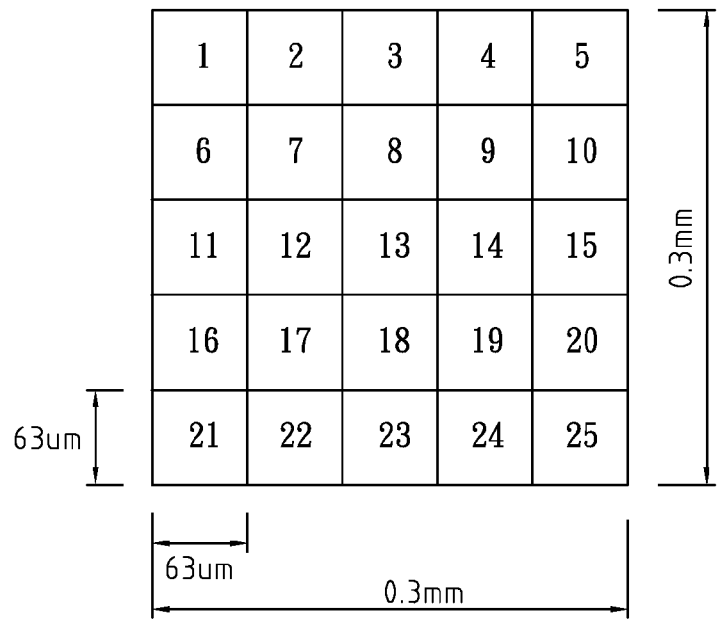
FIG. 9 shows an example of printing position of information marks for the code pattern according to the present invention.

FIG. 9 shows an example of printing positions for information mark of code pattern according to the present invention. For example, the interval of neighbored two nominal positions n employs 0.3 mm as distance. Therefore, as for a nominal position n, a square are of 0.3 mm*0.3 mm using the nominal position n as the center can be further divided into 25 square areas in 63 um*63 um. In an embodiment of the present invention, the position 13 of the square area in 63 um*63 um can only be a reference of the nominal position n, not be the printing position of information mark 20*a*. The positions 1-12 and 14-25 are respectively located around the nominal position n, and using the nominal position n as the center position (position 13), and the positions 1-12 and 14-25 can be used as the printing positions for information marks 20*a*.

Similarly, as for the other nominal positions not used as the information marks 20*a*, the areas formed by the nominal positions can also be used as the printing positions of orientation marks 20*a*.

FIG. 10A~10D show the coding examples for low shift information marks of code pattern according to the present invention, and FIG. 11A~11D show the coding examples for high shift information marks of code pattern according to the present invention. According to the length of distance for the displacement between the information marks 20*a* and the nominal positions n, the information marks 20*a* can be further divided into the low shift information marks and the high shift information marks. For example, the displacement distance of the information marks in FIG. 10A~10D is shorter, so the information marks are the low shift information marks 20*a*; and the displacement distance of the information marks in FIG. 11A~11D is longer, so the information marks are the high shift information marks 20*a*. In FIG. 10A~10D, the information marks 20*a* select respectively the positions 14, 8, 12 and 18 as the printing positions of the low shift information marks, and these low shift information marks 20*a* respectively represent the low shift information code 00, the low shift information code 01, the low shift information code 10 and the low shift information code 11. In FIG. 11A~11D, the information marks 20*a* select respectively the positions 14, 8, 12 and 18 as the printing positions of the high shift information marks, and these high shift information marks 20*a* respectively indicates the high shift information code 00, the high shift information code 01, the high shift information code 10 and the high shift information code 11.

FIG. 12A~12H show other coding examples of the low shift information marks for the code pattern according to the present invention, and FIG. 13A~13H show other coding examples of the high shift information marks for the code pattern according to the present invention. According to the length of distance for the displacement between the information mark 20 and the nominal position n, the information marks 20*a* can further be divided into the low shift information marks and the high shift information marks. For example, the displacement distance of the information marks 20*a* in FIG. 12A~12H is shorter, so the information marks are the low shift information marks; and the displacement distance of the information marks 20*a* in FIG. 13A~13H is longer, so the information marks are the high shift information marks. In FIG. 12A~12H, the information marks 20*a* select respectively the positions 9, 14, 19, 18, 17, 12, 7 and 8 as the printing positions of the low shift information marks, and these low shift information marks 20*a* respectively represent the low shift information code 000, the low shift information code 001, the low shift information code 010, the low shift information code 011, the low shift information code 100, the low shift information code 101, the low shift information code 110, and the low shift information code 111. In FIG. 13A~13H, the information marks 20a select respectively the positions 5, 15, 25, 23, 21, 11, 1 and 3 as the printing positions of the high shift information marks, and these high shift information marks 20a respectively represent the high shift information code 000, the high shift information code 001, the high shift information code 010, the high shift information code 011, the high shift information code 100, the high shift information code 101, the high shift information code 110, and the high shift information code 111.

FIG. 14A~14D show further other coding examples of the low shift information marks for the code pattern according to the present invention, and FIG. 15A~15D show further other coding examples of the high shift information marks for the code pattern according to the present invention. According to the length of distance for the displacement between the information mark 20 and the nominal position n, the information marks 20a can further be divided into the low shift information marks and the high shift information marks. For example, the displacement distance of the information marks 20a in FIG. 14A~14D is shorter, so the information marks are the low shift information marks; and the displacement distance of the information marks 20a in FIG. 15A~15D is longer, so the information marks are the high shift information marks. In FIG. 14A~14D and FIG. 15A~15D, the amount of displacement distance is changed from the original 63 um to 42 um, which is ⅔ of 63 um, so that the arrangement of marks can be more uniform, and has smaller visual impact. The low shift information marks 20a in FIG. 14A~14D represent respectively the low shift information code 00, the low shift information code 01, the low shift information code 10, and the low shift information code 11. The high shift information marks 20a in FIG. 15A~15D represent respectively the high shift information code 00, the high shift information code 01, the high shift information code 10, and the high shift information code 11.

It is further described for the varied example of the configuration method for the information mark 20a. The information mark 20a can be disposed around the nominal position n. In this varied example, the value represented by the information mark 20a is related to the orientation with respect to the nominal position n. In another varied example, the value represented by the information mark 20a is related to the orientation and distance with respect to the nominal position n.

It is further described for another varied example of the configuration method for the information mark 20a. The information mark 20a can be disposed at one of the positions 1~25. In this varied example, the value represented by the information mark 20a depends on which one of positions 1~25 the information mark 20a is disposed at.

It is further described for yet another varied example of the configuration method for the information mark 20a. The information mark 20a can be disposed at one position of the area of the positions 1~25 of the nominal position n. The value represented by the information mark 20a is related to the orientation with respect to the position 13, or related to the orientation and distance with respect to the position 13.

Figure 16A:
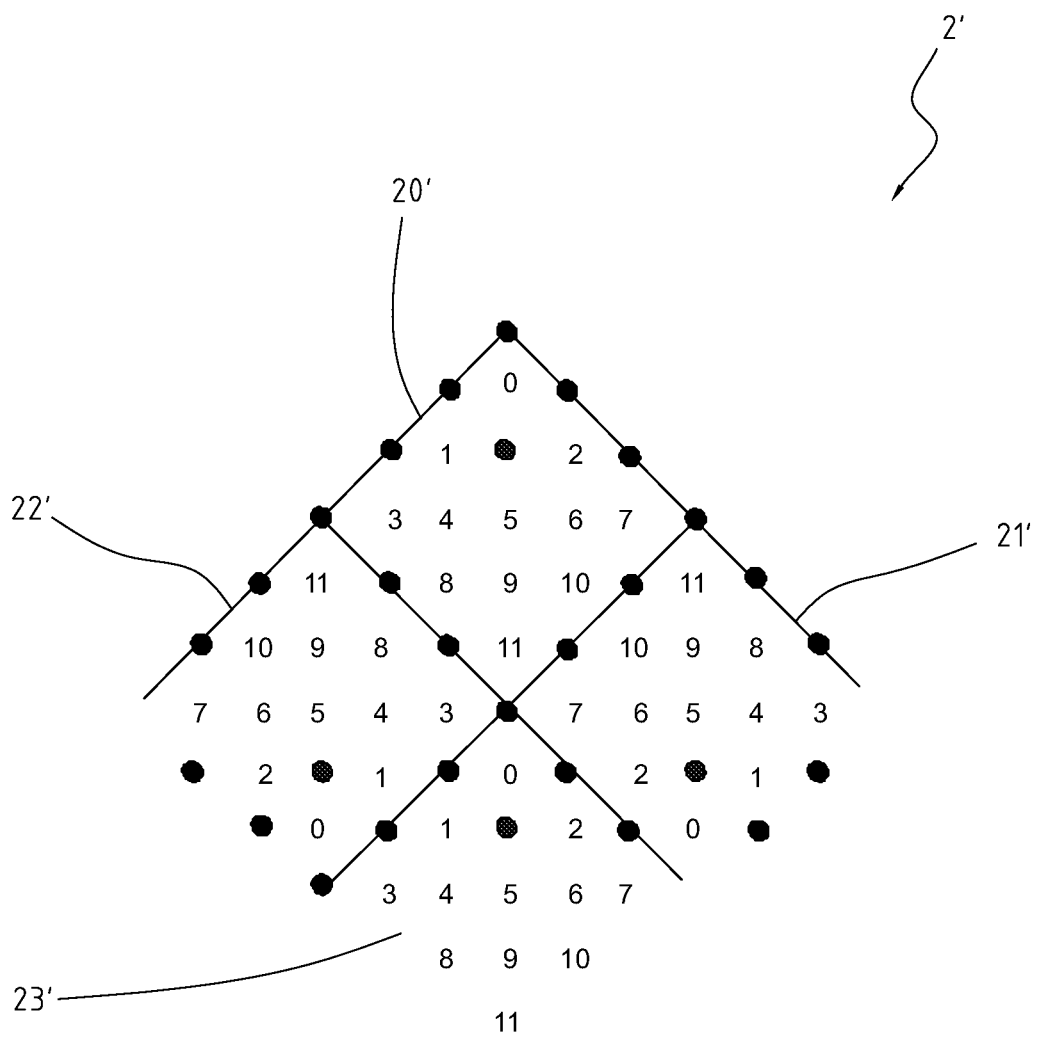
FIG. 16A shows an orthogonal arrangement variance diagram for code patterns for providing information according to the present invention.
Figure 16B:
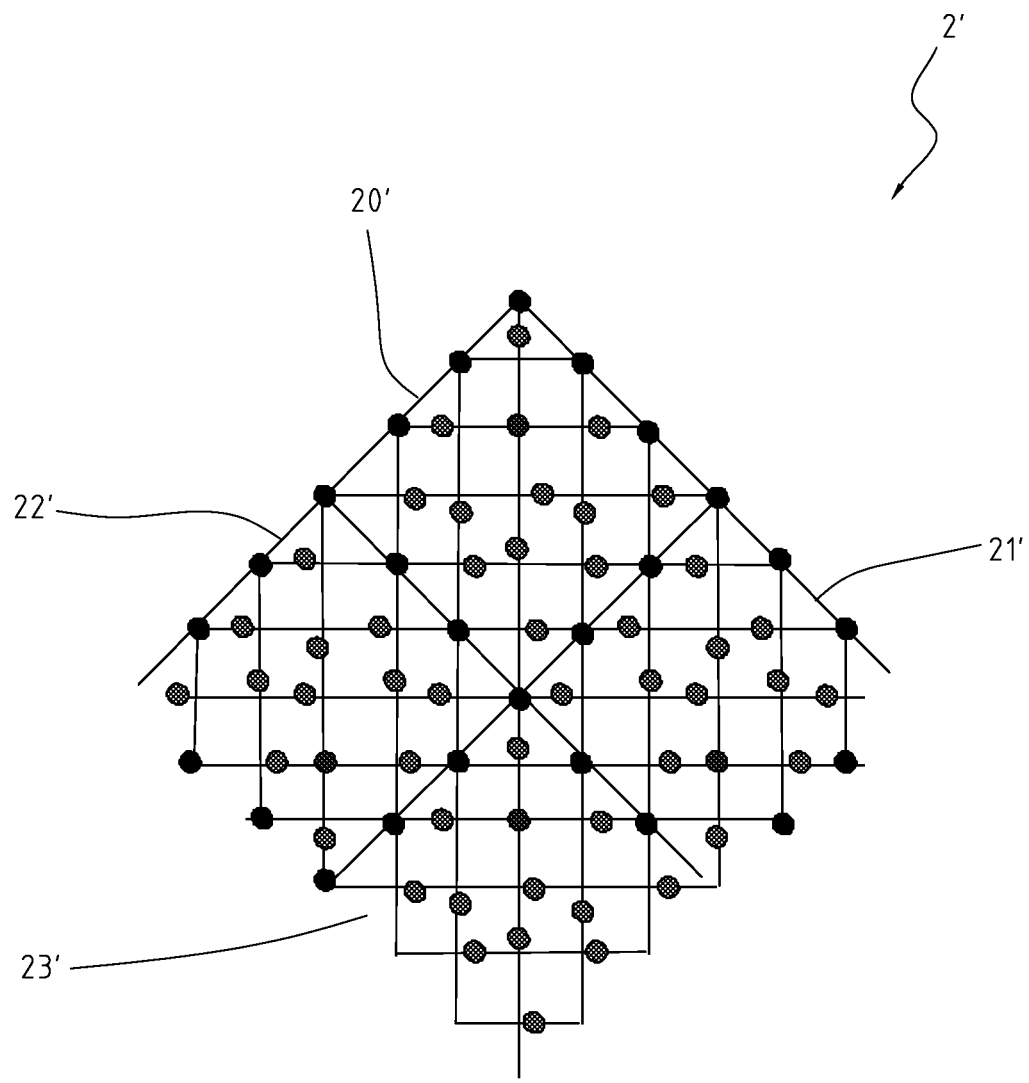
FIG. 16B shows an embodiment of FIG. 16A.

FIG. 16A shows an orthogonal arrangement variance diagram for code patterns for providing information according to the present invention, and FIG. 16B shows an embodiment of FIG. 16A. Please also refer to FIG. 4A, in which it is assumed that the four code patterns in FIG. 4A and the four code patterns in FIG. 16A are all used to indicate the same information, such as indicating the information of letter "A." The four code patterns in FIG. 4A are employed with the means of repetitive code patterns. Further referring to FIG. 7, the four code patterns 20-23 are all used to indicate the same information and the arrangement is employed with repetitive code patterns. The configuration method for code pattern in orthogonal arrangement method according to the present invention can be used to reduce the visual impact. In FIG. 16A, the neighbored code patterns 20' and 21', code patterns 20' and 22', code patterns 22' and 23', and code patterns 21' and 23' in the slanting direction (the slanting direction from upper right to lower left, and the slanting direction from upper left to lower right) are in orthogonal arrangement to each other. And, the four code patterns 20'~23' shown in FIG. 16B are all used to indicate the same information, which is an example of configuration in orthogonal arrangement.

Figure 17A:
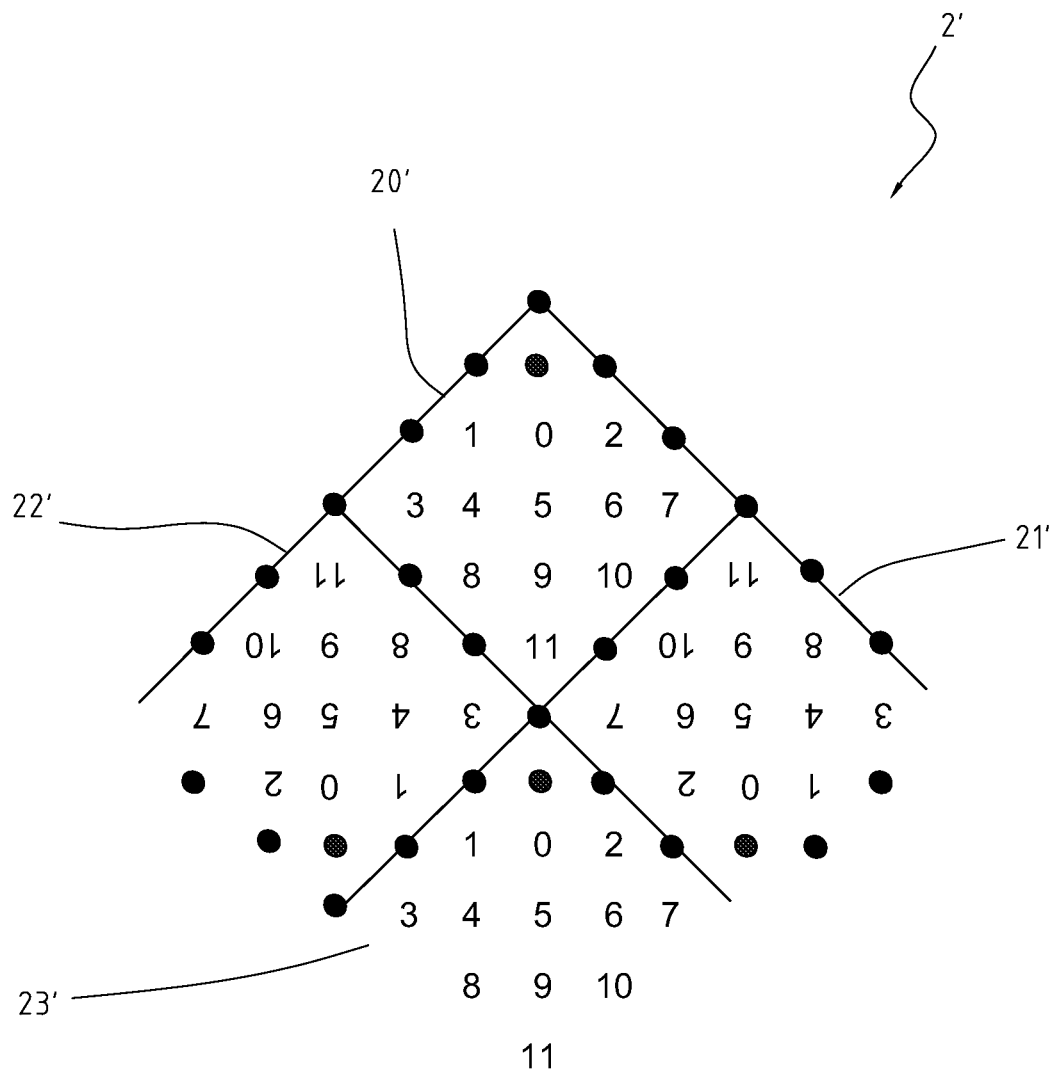
FIG. 17A shows another orthogonal arrangement variance diagram for code patterns for providing information according to the present invention.
Figure 17B:
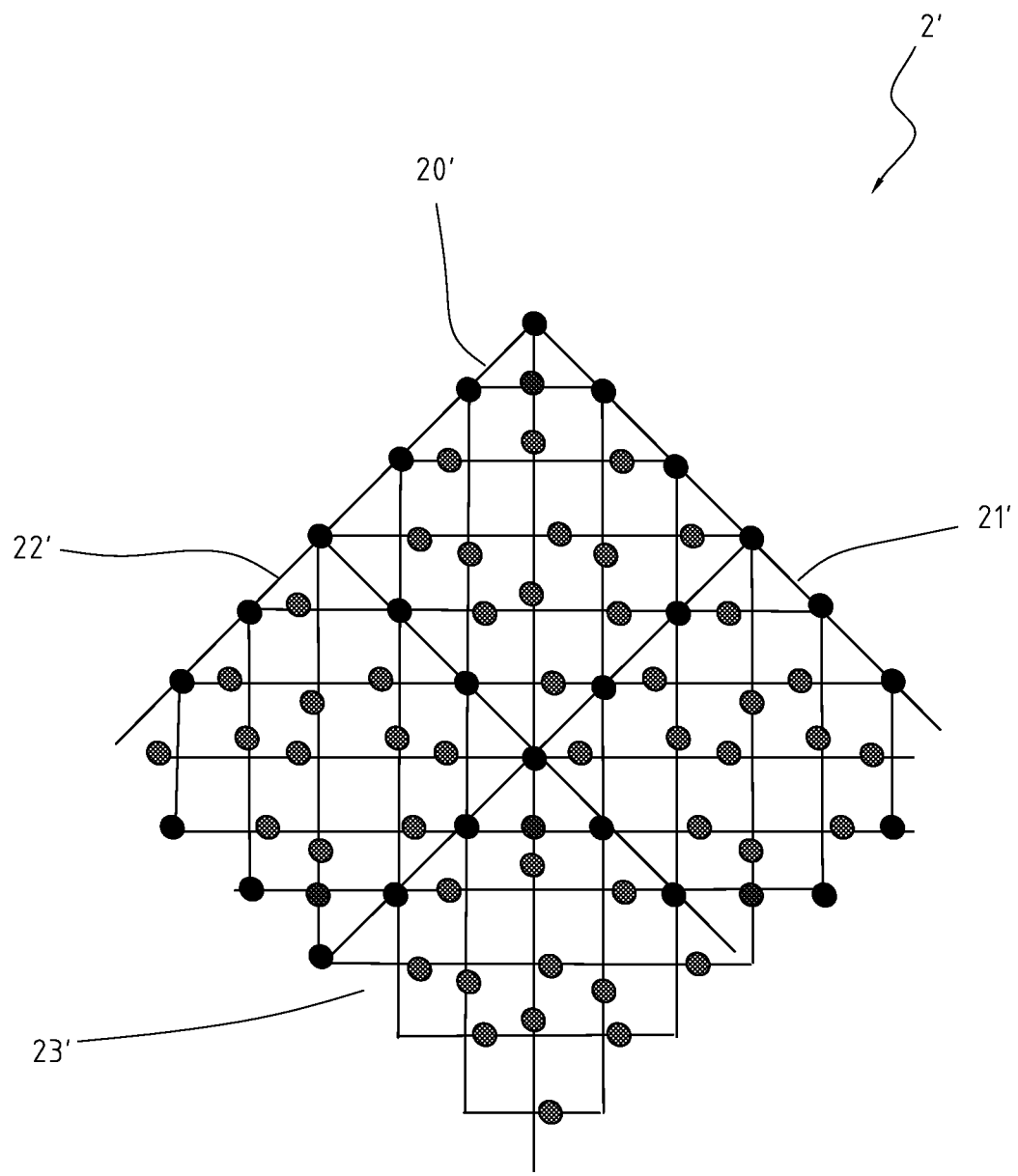
FIG. 17B shows an embodiment of FIG. 17A.

FIG. 17A shows another orthogonal arrangement variance diagram for code patterns for providing information according to the present invention, and FIG. 17B shows an embodiment of FIG. 17A. Similarly, in FIG. 17A, the neighbored code patterns 20' and 21', code patterns 20' and 22', code patterns 22' and 23', and code patterns 21' and 23' in the slanting direction (the slanting direction from upper right to lower left, and the slanting direction from upper left to lower right) are in orthogonal arrangement to each other. And, the four code patterns 20'~23' shown in FIG. 17B are all used to represent the same information, which is an example of configuration in orthogonal arrangement.

Figure 18:
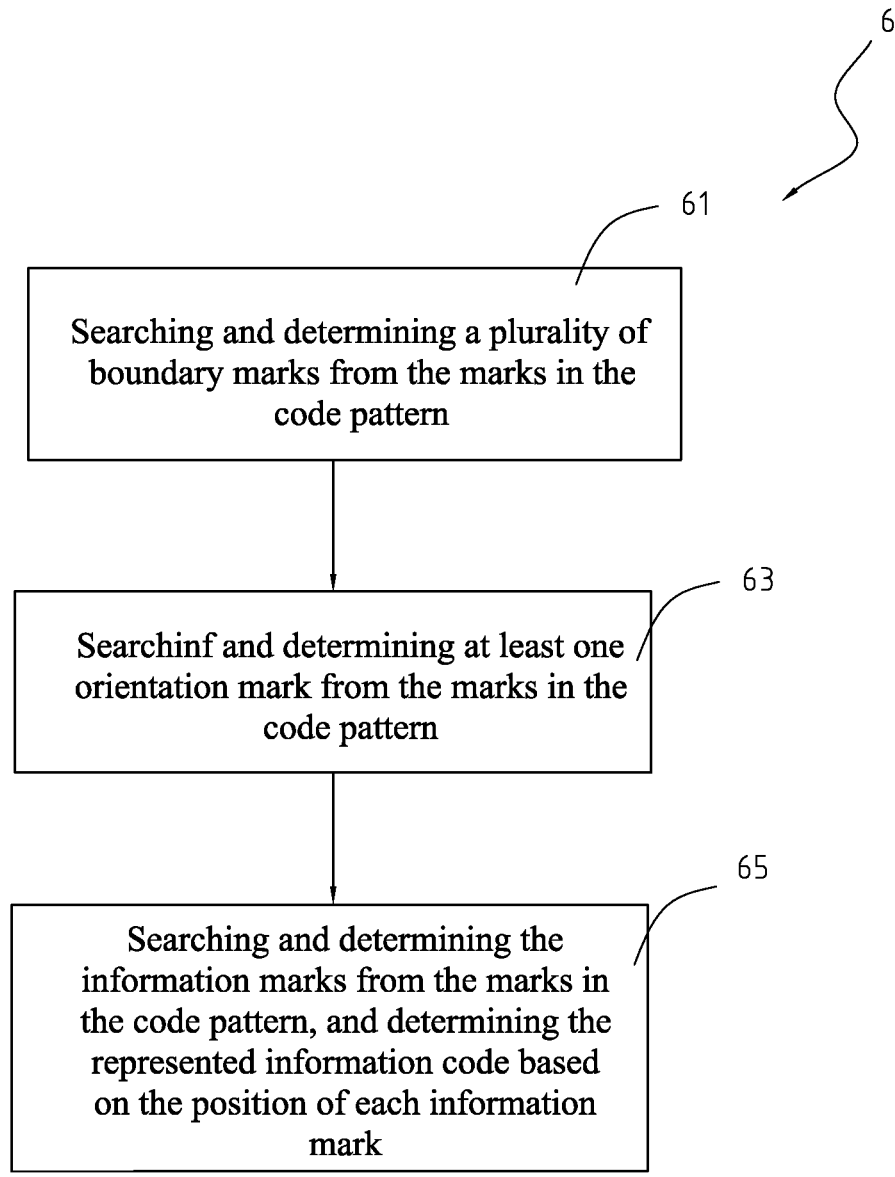
FIG. 18 shows a flow chart of decoding method for code pattern according to the present invention.

FIG. 18 shows a flow chart of decoding method for each code pattern according to the present invention. The decoding method 6 according to the present invention is used to explain each mark 20a of the code pattern 20. The decoding method 6 includes the steps 61~65, which are respectively described as follows.

Step 61 is to search and determine a plurality of boundary marks 20a from the marks 20a of the code pattern 20. Thus, the boundary marks 20a can be employed to determine the above-mentioned nominal positions for the code pattern 20. Because the boundary marks 20a according to the present invention are disposed on the neighbored two sides of the rhombus area 4, the boundary marks 20a can be uses as the boundary of the code pattern 20, and further determine a rhombus area where a code pattern 20 can embrace. Step 63 is to search and determine at least one orientation mark 20a from the marks 20a of the code pattern 20. Thus, the orientation marks 20a can be employed to determine the orientation. Step 65 is to search and determine the information marks 20a from the marks 20a of the code pattern 20, and, based on the location of each information mark 20a, it is determined if the information marks 20a are the low shift information marks or the high shift information marks, i.e. to determine the information code indicated by the information mark 20a.

Figure 19:
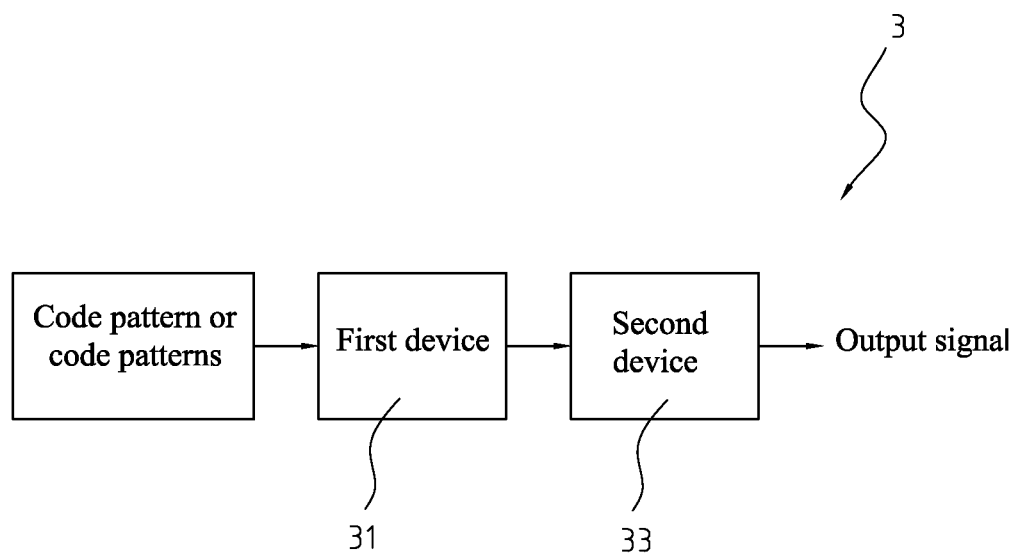
FIG. 19 shows a structural diagram of image processing device for processing code pattern according to the present invention.

FIG. 19 shows a structural diagram of an image processing device for processing the code pattern according to the present invention. The image processing device 3 is used to process the code pattern and the code patterns according to the present invention, and output an output signal of information corresponding to the code patterns. The image processing device 3 comprises: a first device 31 and a second device 33, which are respectively described as follows. The first device 31 is used to optically read the code patterns, such as reading the code pattern 20 and the code patterns 2 in FIG. 7 and FIG. 17, and is used to convert the code pattern 20 and the code patterns 2 into the corresponding digital signals after optical reading. The second device 33 is connected to the first device 31, and the second device 33 is used to process the digital signal, and output the signal of the information code represented by each information mark 20a of the code pattern 20 and the code patterns 2. The specific component for the first device 31 can employ the imaging component at least comprising CCD camera, and the specific component for the second device 33 can employ the component at least comprising the digital signal processor (DSP). In the second device 33, the DSP can be used to execute the firmware, which is specifically implemented according to the decoding method 6 described above.

The code pattern in rhombus area distribution according to the present invention can effectively improve the ratio of effective mark, and also reduce the visual impact, which are the advantages of the present invention.

The above detailed descriptions are only for the preferred embodiments according to the present invention, which cannot be used to limit the scope of the application for the present invention. Those skilled in the art substantially can make a variety of changes and modification, which shall not depart from the substantial content of the present invention.

What is claimed is:

1. A data reading method for code pattern, comprising the following steps:
    searching for a plurality of boundary marks from a code pattern;
    defining a rhombus area according to the boundary marks, wherein the rhombus area comprises a plurality of information marks and at least one orientation mark;
    defining a plurality of nominal positions within the rhombus area according to the boundary marks, wherein the nominal positions are at intersections of a plurality of first hypothetical lines and a plurality of second hypothetical lines, and wherein the first hypothetical lines and the second hypothetical lines are respectively parallel to two diagonal lines of the rhombus area and non-parallel to sides of the rhombus area;
    searching for the at least one orientation mark to determine an orientation of the code pattern; and
    defining one of at least two values represented by the information marks according to the other nominal positions and the positions of the information marks, so as to obtain the information represented by the code pattern;
    wherein the boundary marks are disposed at two adjacent sides of the rhombus area;
    wherein when a number of the boundary marks is five and a number of the at least one orientation mark is one, the code pattern is able to accommodate twelve information dots and has a ratio of effective marks about 66.7%; and
    wherein the ratio of effective marks is equal to a number of the information marks divided by a sum of the numbers of the boundary marks, the at least one orientation mark and the information marks.

2. The data reading method according to claim 1, wherein the step of defining one of the at least two values is to determine the value represented by the information mark according to the orientation from the information mark to the corresponding nominal position.

3. The data reading method according to claim 1, wherein the step of defining one of the at least two values is to determine the value represented by the information mark according to the position at which the information mark is located in the area formed by the corresponding nominal position.

4. The data reading method according to claim 1, wherein the step of defining one of the at least two values is to determine the value represented by the information mark according to the orientation and distance between the information mark and the corresponding nominal position.

5. The data reading method according to claim 1, wherein the step of defining one of the at least two values is to determine the value of the information mark according to the orientation of the information mark with respect to the center of the area formed by the corresponding nominal position.

6. The data reading method according to claim 1, wherein the step of defining one of the at least two values is to determine whether a long offset or a short offset is present.

* * * * *